(12) United States Patent
Andreen

(10) Patent No.: US 9,650,016 B2
(45) Date of Patent: May 16, 2017

(54) DETECTION OF SEATBELT POSITION IN A VEHICLE

(71) Applicant: GM GLOBAL TECHNOLOGY OPERATIONS LLC, Detroit, MI (US)

(72) Inventor: Margaret M. Andreen, Fenton, MI (US)

(73) Assignee: GM Global Technology Operations LLC, Detroit, MI (US)

(*) Notice: Subject to any disclaimer, the term of this patent is extended or adjusted under 35 U.S.C. 154(b) by 73 days.

(21) Appl. No.: 14/560,541

(22) Filed: Dec. 4, 2014

(65) Prior Publication Data
US 2016/0159320 A1 Jun. 9, 2016

(51) Int. Cl.
*G06K 9/00* (2006.01)
*G06K 9/46* (2006.01)
*G06K 9/66* (2006.01)
*B60R 22/48* (2006.01)
*G06T 7/00* (2017.01)

(52) U.S. Cl.
CPC .......... *B60R 22/48* (2013.01); *G06K 9/00832* (2013.01); *G06T 7/004* (2013.01); *B60R 2022/485* (2013.01); *B60R 2022/4808* (2013.01); *B60R 2022/4816* (2013.01); *B60R 2022/4891* (2013.01); *G06T 2207/10004* (2013.01); *G06T 2207/30268* (2013.01)

(58) Field of Classification Search
None
See application file for complete search history.

(56) References Cited

U.S. PATENT DOCUMENTS

| 7,002,457 B2 | 2/2006 | Stevenson et al. |
| 2005/0006886 A1* | 1/2005 | Foo ............ B60R 21/0132 280/735 |

(Continued)

FOREIGN PATENT DOCUMENTS

| DE | 19907716 A1 | 8/2000 |
| DE | 10133759 A1 | 1/2003 |

(Continued)

OTHER PUBLICATIONS

"Vehicle Transmission Shift Interlock/Seat Belt Reminder System"; Research Disclosure, Dec. 2013, Publication No. 596037.

*Primary Examiner* — Randolph I Chu
(74) *Attorney, Agent, or Firm* — Quinn IP Law

(57) ABSTRACT

Method for detecting seatbelt positioning in a vehicle having a seatbelt assembly and the image sensor and vehicle having the same. The seatbelt assembly includes belt webbing with a predefined webbing pattern. An image sensor is configured to take an image of at least a portion of the belt webbing. A controller is operatively connected to the image sensor and has a processor and tangible, non-transitory memory on which is recorded instructions for executing a method for detecting positioning of the belt webbing. The controller is configured to determine a latch status of the seatbelt assembly as being latched or unlatched. If the latch status is latched, the controller is configured to take an image of at least a portion of the belt webbing with the image sensor. The method includes determining if the belt webbing is in a preferred position based at least partially on said image.

16 Claims, 3 Drawing Sheets

(56) References Cited

U.S. PATENT DOCUMENTS

| | | | | |
|---|---|---|---|---|
| 2007/0114775 A1* | 5/2007 | Inuzuka | ............... | B60R 22/34 280/807 |
| 2007/0195990 A1* | 8/2007 | Levy | ............... | B60R 22/48 382/100 |
| 2008/0116680 A1* | 5/2008 | Mita | ............... | B60R 21/01538 280/801.1 |
| 2008/0255731 A1* | 10/2008 | Mita | ............... | B60R 21/01538 701/45 |
| 2008/0267460 A1* | 10/2008 | Aoki | ............... | B60R 21/017 382/118 |
| 2009/0250593 A1* | 10/2009 | Orlewski | ............... | B60R 21/01538 250/206 |
| 2010/0007191 A1* | 1/2010 | Takao | ............... | B60R 22/02 297/475 |
| 2010/0268424 A1* | 10/2010 | Binfet | ............... | B60N 2/002 701/45 |
| 2011/0267186 A1* | 11/2011 | Rao | ............... | B60K 28/08 340/449 |
| 2013/0207442 A1* | 8/2013 | Sickon | ............... | G01B 7/003 297/468 |
| 2014/0266623 A1* | 9/2014 | Graumann | ............... | B60K 28/02 340/10.1 |
| 2014/0266663 A1* | 9/2014 | Schlaps | ............... | B60R 22/48 340/457.1 |
| 2015/0105976 A1* | 4/2015 | Shikii | ............... | G06F 3/0488 701/36 |
| 2015/0317527 A1* | 11/2015 | Graumann | ............... | H04N 7/18 348/148 |
| 2016/0046261 A1* | 2/2016 | Gulash | ............... | B60R 22/48 701/23 |
| 2016/0078306 A1* | 3/2016 | Artan | ............... | B60R 22/48 382/104 |

FOREIGN PATENT DOCUMENTS

| | | | |
|---|---|---|---|
| DE | 102006040244 B3 | | 8/2007 |
| DE | 102010029790 A1 | | 12/2011 |
| JP | 2005098886 A | | 4/2005 |
| JP | 2008199515 A | | 8/2008 |
| JP | 2010113506 | * | 5/2010 |

* cited by examiner

DETECTION OF SEATBELT POSITION IN A VEHICLE

TECHNICAL FIELD

The disclosure relates generally to detecting the position of a seatbelt assembly in a vehicle, and more specifically, to the position of the belt webbing.

BACKGROUND

A vehicle may include a seatbelt monitoring system that determines the latched or unlatched status of the seatbelt based on a switch attached to the buckle. However the information conveyed does not include information on the spatial position of the seatbelt webbing.

SUMMARY

A method for detecting seatbelt position in a vehicle having a seatbelt assembly and the image sensor. The seatbelt assembly includes belt webbing with a predefined webbing pattern. An image sensor is configured to take an image of at least a portion of the belt webbing. A controller is operatively connected to the image sensor and has a processor and tangible, non-transitory memory on which is recorded instructions for executing a method for detecting position of the belt webbing. The method detects how the shoulder portion of the belt webbing, i.e., the portion worn across the torso and over the shoulder, is positioned around the occupant.

Execution of the instructions by the processor causes the controller to (i.e., the controller is configured to) determine a latch status of the seatbelt assembly as being latched or unlatched. If the latch status is latched, the controller is configured to take an image of at least a portion of the belt webbing with the image sensor. The method includes determining if the belt webbing is in a preferred position based at least partially on said image.

The belt webbing pattern may include a plurality of infra-red reflectors. The belt webbing may define a first and a second edge and include a plurality of infra-red reflectors positioned adjacent to the respective first and second edges.

The seatbelt assembly may include a latch plate operatively connected to the belt webbing. Determining a latch status of the seatbelt assembly as being latched or unlatched may include connecting a magnetic element to the latch plate, and detecting the position of the latch plate with a position sensor. The position sensor may include one or more hall sensors configured to sense the position of the latch plate by detecting a location of the magnetic element.

Determining if the belt webbing is in a preferred position may include searching the image for the predefined webbing pattern. Searching the image for the predefined webbing pattern may include: detecting at least one human face within the image and placing a face boundary around the human face; and searching a predetermined search area around the face boundary for the predefined webbing pattern.

Determining if the belt webbing is in a preferred position may include measuring an observed length of the belt webbing in the image. The controller is configured to determine that the belt webbing is in the preferred position if the observed length is above a predefined minimum length.

If the belt webbing is not in the preferred position, a first message may be sent on a vehicle display. If the belt webbing is not in the preferred position, the transmission shifter may be locked. Prior to determining the latch status of the seatbelt assembly, the controller may be configured to determine whether the vehicle ignition is on and the brakes are applied.

The above features and advantages and other features and advantages of the present disclosure are readily apparent from the following detailed description of the best modes for carrying out the disclosure when taken in connection with the accompanying drawings.

DETAILED DESCRIPTION

Figure 1:
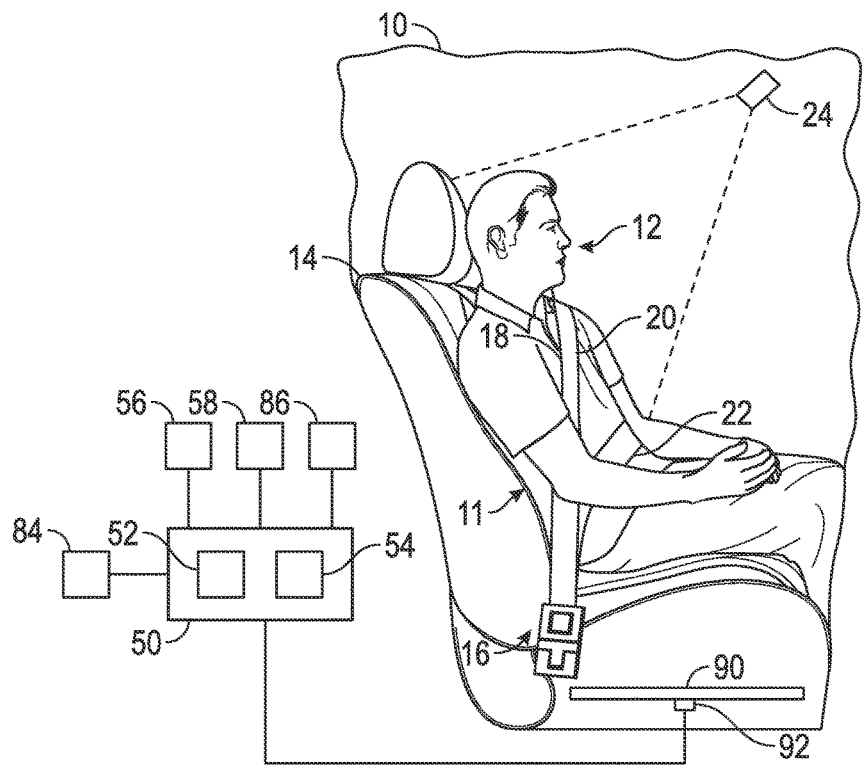
FIG. 1 is a schematic fragmentary partially perspective of a vehicle having a seat, an image sensor, a controller, and a seatbelt assembly including a belt webbing and a buckle assembly.

Referring to the Figures, wherein like reference numbers refer to the same or similar components throughout the several views, FIG. 1 shows a vehicle 10 having a seatbelt assembly 11 for securing an occupant 12 on a vehicle seat 14. The seatbelt assembly 11 includes a buckle assembly 16. Referring to FIG. 1, the seatbelt assembly 11 includes a belt webbing 18 defining a shoulder portion 20 and a lap portion 22. An image sensor 24 is configured to take an image of at least a portion of the belt webbing 18.

Figures 2, 3:
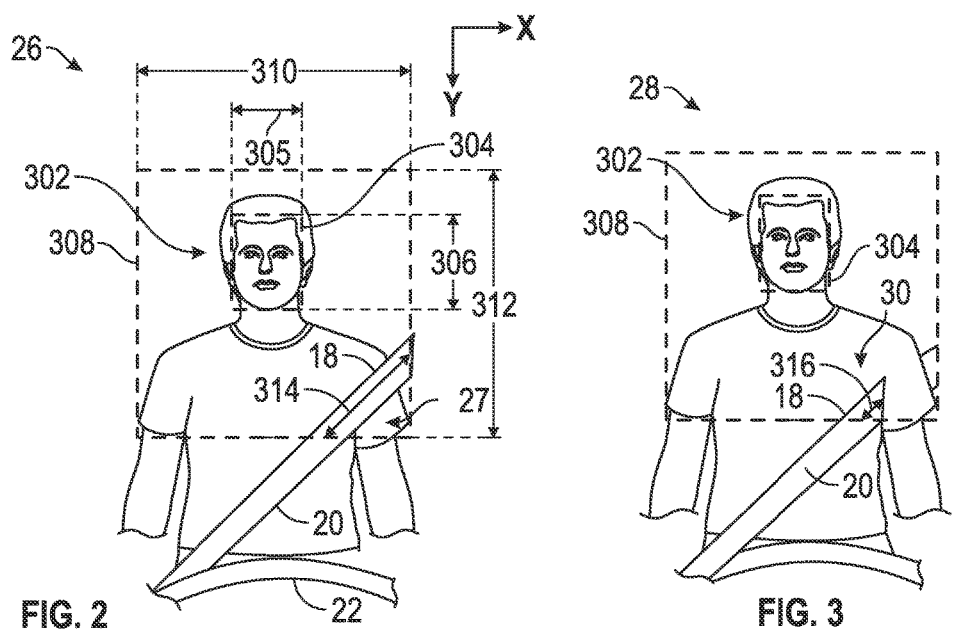
FIG. 2 is a schematic fragmentary view of an example first image taken by the image sensor of FIG. 1.
FIG. 3 is a schematic fragmentary view of an example second image taken by the image sensor of FIG. 1.

FIG. 2 is a schematic fragmentary view of an example first image 26 taken by the image sensor 24, showing the belt webbing 18 in a preferred position 27. FIG. 3 is a schematic fragmentary view of an example second image 28 taken by the image sensor 24, showing the belt webbing 18 in a non-preferred position 30. For clarity, the vehicle seat 14 is omitted in the first and second images 26, 28. The image sensor 24 may be a CCD camera. The image sensor 24 may include, for example, one or more charge-coupled devices (CCDs) configured to convert light energy into a digital signal. The charge-coupled device is an analog device that creates a small electrical charge in each photo sensor when impacted by light. The charges are converted to voltage one pixel at a time as they are read from the chip and turned into digital data using additional circuitry. The image sensor 24 may include a complementary metal-oxide-semiconductor chip (CMOS), which is an active pixel sensor having circuitry next to each photo sensor converting the light energy to a voltage, which is then converted to digital data using additional circuitry on the chip. A plurality of image sensors 24 may be employed, with each being positioned in view of a respective seat position. A single image sensor 24 may be employed for all rear occupants.

Figure 4:
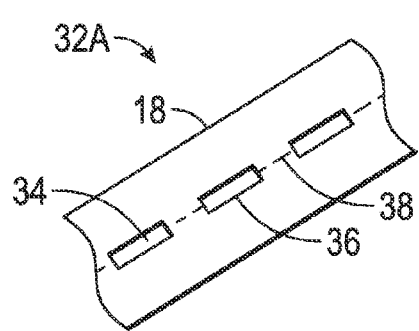
FIG. 4 is a schematic fragmentary view of an example first webbing pattern for the belt webbing of FIG. 1.
Figure 5:
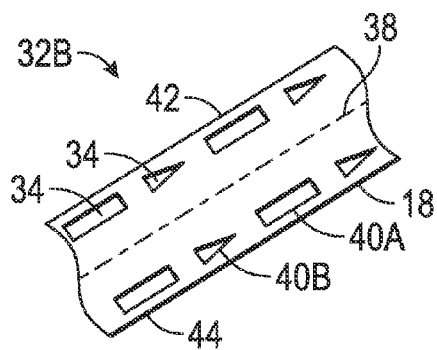
FIG. 5 is a schematic fragmentary view of an example second webbing pattern for the belt webbing of FIG. 1.

Referring to FIG. 1, the belt webbing 18 (shown in FIG. 1) is marked with a predefined webbing pattern. FIGS. 4 and 5 illustrate a first example webbing pattern 32A and a second example webbing pattern 32B, respectively, for the belt webbing 18. It is to be understood that the webbing patterns 32A and 32B are presented as an example only and are not intended to be limiting. Any other webbing pattern may be employed. The belt webbing 18 may be detected by having one or more infra-red reflectors 34, shown in FIGS. 4-5, woven or otherwise attached to the belt webbing 18. The image sensor 24 may be configured to be sensitive to infra-red light.

In the example illustrated in FIG. 4, the first webbing pattern 32A includes a series of tracks 36 positioned along the centerline 38 of the webbing. The tracks 36 may be substantially rectangular in shape. In the example illustrated in FIG. 5, the second webbing pattern 32B includes a series of uniformly spaced objects of various shapes such as rectangle 40A and triangle 40B. As shown in FIG. 5, the objects, such as rectangle 40A and triangle 40B, may be positioned adjacent to or lining up with the first and second edges 42, 44, respectively, of the belt webbing 18.

Referring to FIG. 1, a controller 50 is operatively connected to the image sensor 24 and the seatbelt assembly 11. Referring to FIG. 1, the controller 50 has a processor 52 and tangible, non-transitory memory 54 on which are recorded instructions for executing a method 100, described below with reference to FIG. 6, for detecting positioning of the belt webbing 18. Referring to FIG. 2, the method 100 includes determining if the belt webbing 18 is in the preferred position 27 based at least partially on the image 26 taken by the image sensor 24.

The method 100 detects how the shoulder portion 20 (shown in FIGS. 1-3) of the belt webbing 18, i.e., the portion worn across the torso and over the shoulder of an occupant 12, is positioned. Thus if the shoulder portion 20 of the belt webbing 18 is placed behind the arm of the occupant 12 (such as shown in the second image 28 in FIG. 3 showing the belt webbing 18 in a non-preferred position 30), a message may be displayed and/or other vehicle components disabled. The preferred position 27 may be characterized by the shoulder portion 12 of the belt webbing 18 being worn across the shoulder of the occupant 12 without any obstructions.

The controller 50 may be an integral portion of or a separate module operatively connected to other control modules of the vehicle 10, such as the vehicle body control module. The vehicle 10 may be any passenger or commercial automobile such as a hybrid electric vehicle, including a plug-in hybrid electric vehicle, an extended range electric vehicle, or other vehicles. The vehicle may take many different forms and include multiple and/or alternate components and facilities. While an example vehicle is shown in the Figures, the components illustrated in the Figures are not intended to be limiting. Indeed, additional or alternative components and/or implementations may be used.

Figure 6:
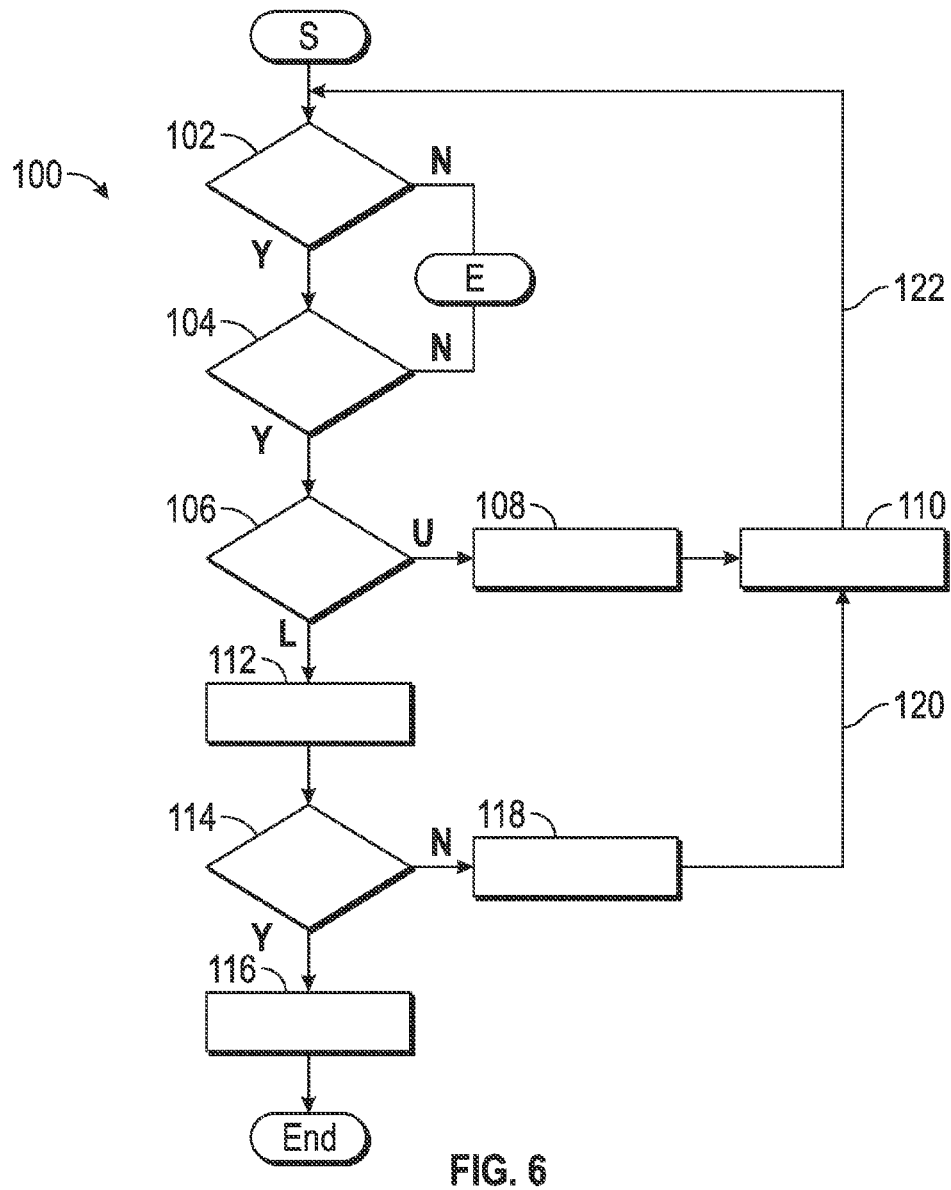
FIG. 6 is a flowchart of a method stored on and executable by the controller of FIG. 1.

Referring now to FIG. 6, a flowchart of a method 100 stored on and executable by the controller 50 of FIG. 1 is shown. The start and end of the method 100 are indicated by the letters "S" and "E" in FIG. 2, respectively. Method 100 need not be applied in the specific order recited herein. Furthermore, it is to be understood that some steps may be eliminated. Method 100 is described below with reference to FIGS. 1-3 and 6-8.

Referring to FIG. 6, method 100 may begin with step 102 where the controller 50 determines whether the ignition 56 (see FIG. 1) is on. If so, the method 100 proceeds to step 104 where the controller 50 determines if the brakes 58 (see FIG. 1) are applied. If the ignition 56 is not on or the brakes 58 are not applied, the method 100 is ended (E).

Figure 7:
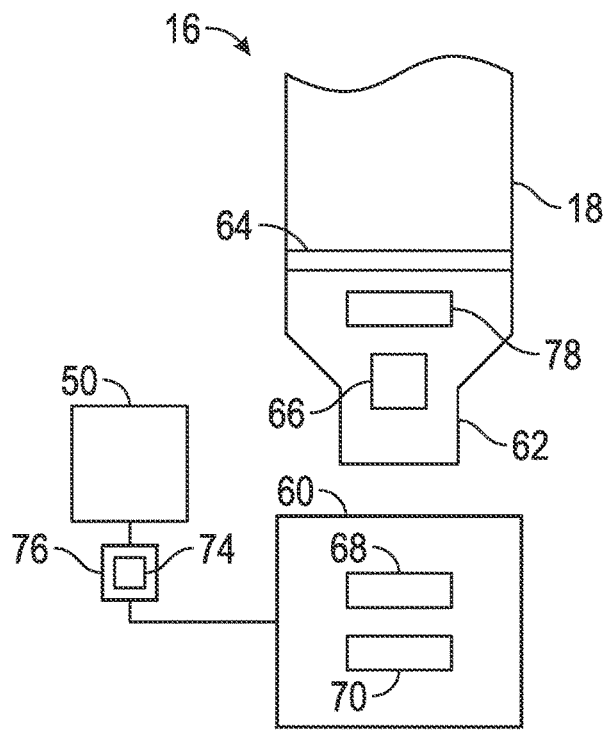
FIG. 7 is a schematic fragmentary view of one example of the buckle assembly of FIG. 1.

In step 106 of FIG. 6, if the brakes 58 are applied, a latch status of the seatbelt assembly 11 is determined by the controller 50 as being latched or unlatched. One example of a buckle assembly 16 is shown in FIG. 7. Any other type of buckle assembly 16 known to those skilled in the art may be employed. Referring to FIG. 7, the buckle assembly 16 may include a buckle portion 60 and a latch plate 62. The latch plate 62 is connected to a first end 64 of the belt webbing 18. The latch plate 62 includes a cut-out 66 that is inserted into a narrow slot 68 in the buckle portion 60 such that a retention member (not shown) locks the latch plate 62 into place. Referring to FIG. 7, the buckle 60 includes a release button 70 that is operatively connected to the retention member (not shown) such that depression of the release button 70 causes the latch plate 62 to separate from the buckle portion 60, entering the unlatched status (depicted in FIG. 6 as "U"). When the latch plate 62 is fully inserted into the buckle portion 60, it enters the latched state (depicted in FIG. 6 as "L").

Referring to FIG. 7, a position sensor 74 may be configured to detect the position of the latch plate 62. The position sensor 74 is configured to detect whether the seatbelt assembly 11 is in the latched or unlatched state by sensing the position of the latch plate 62. The position sensor 74 may be mounted to the buckle portion 60 and operatively connected to the controller 50.

Referring to FIG. 7, the position sensor 74 may include at least one hall effect sensor 76 configured to detect the position of a magnetic element 78 fixedly mounted to the latch plate 62. As the latch plate 62 moves between the latched and unlatched states, the magnetic element 78 also moves, thereby altering the local magnetic field. The hall effect sensor 76 is configured to vary its output voltage in response to changes in the magnetic field. The position sensor 74 may include circuitry that allows it to act in a digital (on/off) mode, thereby acting as a switch for detecting whether the latch plate 62 is in the latched or unlatched state. Any other system of detecting the latch status of the seatbelt assembly 11 may be employed.

In step 108 of FIG. 6, if the latch status is unlatched ("U"), the controller 50 may be configured to display a first message to a vehicle display 84 (see FIG. 1) communicating that the seatbelt assembly 11 is unlatched. The vehicle display 84 may be a screen on the instrument panel (not shown). The vehicle display 84 may be a heads-up display reflected off the vehicle windshield (not shown). The vehicle display 84 may be a driver information center in the instrument panel (not shown), which includes a belt reminder icon that lights up. Additionally, the first message may include a voice alert and/or an audible chime. In step 110 of FIG. 6, the controller 50 may be configured to lock the transmission shifter 86, i.e., dis-allow shifting. The transmission shifter 86 may be locked by engaging the brake transmission shift interlock, which requires an operator to depress the brake pedal (not shown) prior to shifting out of park. The transmission shifter 86 may be locked by any other mechanism.

In step 112 of FIG. 6, if the latch status of the seatbelt assembly 11 is latched ("L"), the controller 50 is configured to take an image (such as first and second images 26, 28 shown in FIGS. 2-3) of at least a portion of the belt webbing 18 with the image sensor 24. In step 114 of FIG. 2, the controller 50 is configured to determine if the belt webbing 18 is in a preferred position 27 (shown in FIG. 2).

In step 116 of FIG. 6, if the belt webbing 18 is in the preferred position 27 (shown in FIG. 2), the shifting of the transmission shifter 86 is allowed. If the belt webbing 18 is not in the preferred position 27, in step 118 of FIG. 6, the controller 50 may be configured to display a second message communicating that the position of the belt webbing 18 needs to be checked. If the belt webbing 18 is not in the preferred position 27, the controller 50 may be configured to lock the transmission shifter 86 (i.e., proceed to step 110), as shown by line 120. As indicated by line 122, the method 100 may be looped back to step 102. The method 100 may cycle or repeat continuously while the vehicle 10 is in operation. Thus for example, during a trip, if a seat occupant (front or rear) unlatched the seatbelt assembly 11, notice may be given to the driver per step 108 of FIG. 6, in which the controller 50 is configured to display a first message to a vehicle display 84 (such as a driver information center in the instrument panel, which may include a belt reminder icon that lights up). Additionally, if during a trip a seat occupant (front or rear) moved the belt webbing 18 out of the preferred position, notice may be given to the driver per step 118 of FIG. 6, in which the controller 50 is configured to display a second message communicating that the position of the belt webbing 18 needs to be checked.

Figure 8:
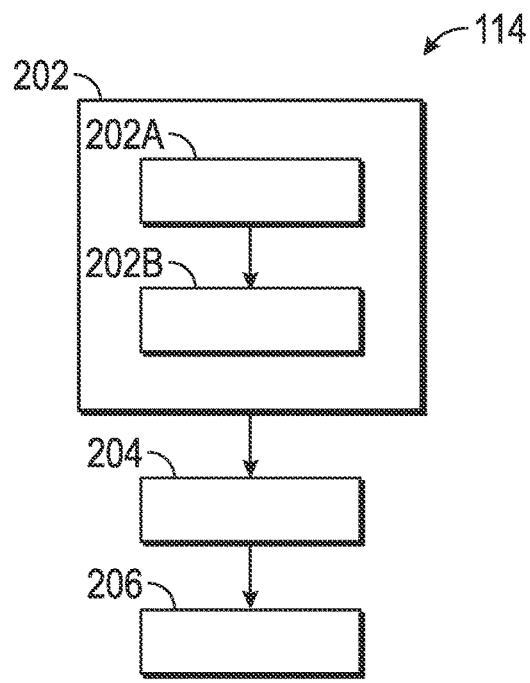
FIG. 8 is a flowchart of a sub-method stored on and executable by the controller for a portion or one step of the method shown in FIG. 7.

FIG. 8 is a flowchart of a sub-method stored on and executable by the controller 50 for carrying out step 114 of the method 100 shown in FIG. 6, that is, for determining if the belt webbing 18 is in a preferred position based at least partially on the image obtained. Referring to FIG. 8, in step 202, the controller 50 is configured to search the image for the predefined webbing pattern; step 202 may include sub-steps 202A and 202B.

In sub-step 202A of FIG. 8, at least one human face 302 (see FIGS. 2-3) is detected within the image (see first and second images 26, 28 in FIGS. 2-3, respectively) and a bounding box or rectangle or any other shape, referred to herein as the face boundary 304, is placed around the human face 302. The face boundary 304 is obtained by detecting facial features such as eyes, nose, cheekbones, and jaw. Referring to FIG. 2, the face boundary 304 defines a boundary width 305 ($B_w$) and boundary length 306 ($B_L$). In one embodiment, the face boundary 304 is determined by employing haar-like features which consider adjacent rectangular regions at specific locations in a detection window. The respective pixel intensities in each rectangular region are summed up and the difference between these sums are calculated. The known difference in pixel intensities between face features such as eyes, nose, cheekbones, and jaw and other portions of the image is used to delineate the face boundary 304. Any other type of face detection system known to those skilled in the art may be employed.

In sub-step 202B of FIG. 8, the controller 50 is configured to search a predefined search area 308 around the face boundary 304 for the predefined webbing pattern, such as first/second webbing pattern 32A/32B. Referring to FIG. 2, the search area 308 around the face boundary 304 is searched in order to detect positioning of the shoulder portion 20 of the belt webbing 18, as opposed to the lap portion 22. Referring to FIG. 2, the search area 308 defines a search area width 310 ($S_W$) and search area length 312 ($S_L$). The search area width 310 ($S_W$) and search area length 312 ($S_L$) may be set up or configured as a linear function of the boundary width 305 ($B_w$) and boundary length 306 ($B_L$), respectively. In one example:

$$S_W = c * B_w \qquad \text{eq}(1)$$

$$S_L = d * B_L \qquad \text{eq}(2)$$

Here c and d are constants ranging in value from about 2 to about 5. In one example, c is about 3 and d is about 2. Any other method for defining the search area 308 may be employed.

The size of the predefined search area 308 may be varied based on the expected position of the belt webbing 18, which may be estimated from factors such as the occupant weight detected. If the occupant weight is above a threshold weight, the size of the predefined search area 308 may be increased. Thus, sub-step 202B of FIG. 8 (in which the controller 50 is configured to search a predefined search area 308 around the face boundary 304 for the webbing pattern 32A/32B) may include determining whether a load applied to the vehicle seat 14 (see FIG. 1) is within a predetermined seat-load range. In one embodiment, referring to FIG. 1, a fluid-filled pouch 90 may be placed under the vehicle seat 12. The pouch 90 may contain a fluid such as silicone. Referring to FIG. 1, a pressure sensor 92 may be coupled to the pouch 90, which provides an electrical output signal to the controller 50 indicative of the fluid pressure exerted on the pouch 90.

In one embodiment, a first search area (corresponding to a first size which may be classified as "adult") is employed when the force, weight or pressure on the vehicle seat 14, as detected by the pouch 90 and pressure sensor 92 of FIG. 1 or any other devices, is at or above a predetermined adult load for a minimum time TA. In one example, the pressure is in excess of 100 pounds is detected for at least 30 seconds. If the force, weight or pressure on the vehicle seat 12 is below the predetermined adult load for a minimum time TA, a second search area may be employed. The second search area may correspond to a second size which may be classified as "child." The first search area may be greater in area than the second search area, with greater respective constants c and d as defined above in equations 1 and 2.

Stated differently, the controller 50 may be configured to employ a first search area as the predefined search area 308 if the load applied to the vehicle seat 14 is within a first predetermined seat-load range (e.g., 0-100 pounds). The controller 50 may be configured to employ a second search area as the predefined search area 308 if the load applied to the vehicle seat 14 is within a second predetermined seat-load range (e.g., 101-200 pounds), where the first search area is greater in area than the first search area. The controller 50 may be configured to employ a third search area as the predefined search area 308 if the load applied to the vehicle seat 14 is within a third predetermined seat-load range (e.g., 201-300 pounds), where the third search area is greater in area than the second search area.

In step 204 of FIG. 8, the controller 50 is configured to measure an observed length L of the belt webbing 18 in the image. Referring to FIG. 2, the first image 26 shows the belt webbing 18 with a first observed length 314. Referring to FIG. 3, the second image 28 shows the belt webbing 18 with a second observed length 316.

In step 206 of FIG. 8, the controller 50 is configured to determine that the belt webbing 18 is in the preferred position 27 if the observed length L is at or above a predefined minimum length $L_{min}$. Thus, referring to FIG. 2, the first observed length 314 is at or above a predefined minimum length $L_{min}$ in the first image 26, indicating that the belt webbing 18 is in the preferred position 27. Referring to FIG. 3, the second observed length 316 is below the predefined minimum length $L_{min}$ in the second image 28, indicating that the belt webbing 18 is not in the preferred position 27. The predefined minimum length $L_{min}$ may be defined as a linear function of the boundary width 305 ($B_w$) and boundary length 306 ($B_L$). Any other definition for the predefined minimum length $L_{min}$ may be employed. In one example, where e is a constant less than 1:

$$L_{min} = e(B_W + B_L) \qquad \text{(eq 3)}$$

The observed length L may be measured by employing feature extraction software to determine the presence of the belt webbing 18, using the features of the predefined webbing pattern, such as first/second webbing patterns 32A/32B shown in FIGS. 4-5 and described above. The Hough transform may be employed to identify the predefined webbing pattern. As is known to those skilled in the art, the Hough transform is a feature extraction technique that extracts lines as well as arbitrary shapes, such as circles or ellipses, from a digital image. The Hough transform finds imperfect instances of objects within a certain class of shapes by dividing objects into various spaces constructed by the algorithm for computing the Hough transform. Any other feature extraction technique known to those skilled in the art may be employed. The controller 50 may be configured to detect the predefined webbing pattern based on an increase in reflectivity of the infra-red reflectors 34 (shown in FIGS. 4-5) on the belt webbing 18.

As noted above, the controller 50 of FIG. 1 may include a computing device that employs an operating system or processor 52 and memory 54 for storing and executing computer-executable instructions. Computer-executable instructions may be compiled or interpreted from computer programs created using a variety of programming languages and/or technologies, including, without limitation, and either alone or in combination, Java™, C, C++, Visual Basic, Java Script, Perl, etc. In general, a processor 52 (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which may constitute a main memory. Such instructions may be transmitted by one or more transmission media, including coaxial cables, copper wire and fiber optics, including the wires that comprise a system bus coupled to a processor of a computer. Some forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Look-up tables, databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store may be included within a computing device employing a computer operating system such as one of those mentioned above, and may be accessed via a network in any one or more of a variety of manners. A file system may be accessible from a computer operating system, and may include files stored in various formats. An RDBMS may employ the Structured Query Language (SQL) in addition to a language for creating, storing, editing, and executing stored procedures, such as the PL/SQL language mentioned above.

The detailed description and the drawings or figures are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

The invention claimed is:

1. A method of detecting seatbelt position in a vehicle having a seatbelt assembly and an image sensor, the method comprising:
   determining a latch status of the seatbelt assembly as being latched or unlatched;
   wherein the seatbelt assembly includes a belt webbing with a predefined webbing pattern;
   if the latch status is latched, taking an image of at least a portion of the belt webbing with the image sensor;
   determining if the belt webbing is in a preferred position based at least partially on the image, including searching the image for the predefined webbing pattern; and
   wherein said searching the image for the predefined webbing pattern includes:
      detecting at least one human face within the image;
      placing a face boundary around the at least one human face within the image; and
      searching a predefined search area around the face boundary for the predefined webbing pattern.

2. The method of claim 1, wherein the belt webbing defines a first and a second edge and a plurality of infra-red reflectors positioned adjacent to the first and second edges.

3. The method of claim 1, wherein the vehicle includes a display and further comprising:
   if the belt webbing is not in the preferred position, displaying a first message on the display.

4. The method of claim 1, wherein the vehicle includes a transmission shifter and further comprising:
   if the belt webbing is not in the preferred position, disabling the transmission shifter to prevent shifting.

5. The method of claim 1, wherein the seatbelt assembly includes a latch plate operatively connected to the belt webbing and said determining a latch status of the seatbelt assembly as being latched or unlatched includes:
   connecting a magnetic element to the latch plate;
   detecting the position of the latch plate with a position sensor; and
   wherein the position sensor includes one or more hall sensors configured to sense the position of the latch plate by detecting a location of the magnetic element.

6. The method of claim 1, wherein said determining if the belt webbing is in a preferred position further includes:
   measuring an observed length of the belt webbing in the image; and
   determining that the belt webbing is in the preferred position if the observed length is above a predefined minimum length.

7. The method of claim 1, wherein the vehicle includes a vehicle seat operatively connected to the seatbelt assembly and said searching a predefined search area around the face boundary for the predefined webbing pattern includes:
   determining whether a load applied to the vehicle seat is within one of a plurality of predetermined seat-load ranges;
   employing a first search area as the predefined search area if the load applied to the vehicle seat is within a first of the plurality of predetermined seat-load ranges;
   employing a second search area as the predefined search area if the load applied to the vehicle seat is within a second of the plurality of predetermined seat-load ranges; and
   employing a third search area as the predefined search area if the load applied to the vehicle seat is within a third of the plurality of predetermined seat-load ranges.

8. A vehicle comprising:
   a seatbelt assembly including a belt webbing, wherein the belt webbing has a predefined webbing pattern;
   an image sensor configured to take an image of at least a portion of the belt webbing; and
   a controller operatively connected to the image sensor and having a processor and tangible, non-transitory memory on which is recorded instructions for executing a method for detecting position of the belt webbing;
   wherein execution of the instructions by the processor causes the controller to:
      determine a latch status of the seatbelt assembly as being latched or unlatched;
      if the latch status is latched, take an image of at least a portion of the belt webbing with the image sensor;
      determine if the belt webbing is in a preferred position based at least partially on said image, including searching the image for the predefined webbing pattern; and
   wherein said searching the image for the predefined webbing pattern includes:
      detecting at least one human face within the image;
      placing a face boundary around the at least one human face within the image; and
      searching a predefined search area around the face boundary for the predefined webbing pattern.

9. The vehicle of claim 8, wherein the belt webbing includes a plurality of infra-red reflectors.

10. The vehicle of claim 8, wherein the belt webbing defines a first and a second edge and a plurality of infra-red reflectors positioned adjacent to the first and second edges.

11. The vehicle of claim 8, wherein the vehicle includes a display and wherein the controller is configured to, if the belt webbing is not in the preferred position, display a first message on the display.

12. The vehicle of claim 8, wherein the vehicle includes a transmission shifter and wherein the controller is configured to, if the belt webbing is not in the preferred position, disable the transmission shifter to prevent shifting.

13. The vehicle of claim 8, wherein the seatbelt assembly includes a latch plate operatively connected to the belt webbing and wherein said determining a latch status of the seatbelt assembly as being latched or unlatched includes:
   connecting a magnetic element to the latch plate;
   detecting the position of the latch plate with a position sensor; and
   wherein the position sensor includes one or more hall sensors configured to sense the position of the latch plate by detecting a location of the magnetic element.

14. The vehicle of claim 8, wherein said determining if the belt webbing is in a preferred position includes:
   measuring an observed length of the belt webbing in the image; and
   determining that the belt webbing is in the preferred position if the observed length is above a predefined minimum length.

15. The vehicle of claim 8, wherein the vehicle includes a vehicle seat operatively connected to the seatbelt assembly and said searching a predefined search area around the face boundary for the predefined webbing pattern includes:
   determining whether a load applied to the vehicle seat is within one of a plurality of predetermined seat-load ranges;
   employing a first search area as the predefined search area if the load applied to the vehicle seat is within a first of the plurality of predetermined seat-load ranges;
   employing a second search area as the predefined search area if the load applied to the vehicle seat is within a second of the plurality of predetermined seat-load ranges; and
   employing a third search area as the predefined search area if the load applied to the vehicle seat is within a third of the plurality of predetermined seat-load ranges.

16. A method of detecting seatbelt position in a vehicle having a seatbelt assembly, a transmission shifter and an image sensor, the method comprising:
   determining a latch status of the seatbelt assembly as being latched or unlatched;
   wherein the seatbelt assembly includes a belt webbing with a predefined webbing pattern;
   if the latch status is latched, taking an image of at least a portion of the belt webbing with the image sensor;
   determining if the belt webbing is in a preferred position based at least partially on the image, including:
      searching the image for the predefined webbing pattern;
      measuring an observed length of the belt webbing in the image; and
      determining that the belt webbing is in the preferred position if the observed length is above a predefined minimum length;
   if the belt webbing is not in the preferred position, disabling the transmission shifter to prevent shifting; and
   wherein said searching the image for the predefined webbing pattern includes:
      detecting at least one human face within the image;
      placing a face boundary around the at least one human face within the image; and
      searching a predefined search area around the face boundary for the predefined webbing pattern.

* * * * *